(12) United States Patent
Fukui et al.

(10) Patent No.: US 6,169,947 B1
(45) Date of Patent: Jan. 2, 2001

(54) VEHICLE OCCUPANT PROTECTION SYSTEM

(75) Inventors: Tsutomu Fukui, Tochigi-ken; Nobuhiro Koyota; Kazutomo Isonaga, both of Utsunomiya; Koichi Kamiji, Tochigi-ken, all of (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/195,231

(22) Filed: Nov. 18, 1998

(30) Foreign Application Priority Data

Nov. 26, 1997 (JP) .................................................. 9-324675

(51) Int. Cl.⁷ .................................................. G05D 1/00

(52) U.S. Cl. ............................ 701/45; 180/271; 280/735; 307/10.1; 340/457.1

(58) Field of Search .................................. 701/36, 45, 46, 701/47; 180/271, 273; 280/734, 735; 307/10.1; 340/438, 457, 457.1

(56) References Cited

U.S. PATENT DOCUMENTS 5,626,359 * 5/1997 Steffens, Jr. et al. ................. 280/735
5,900,677 * 5/1999 Musiol et al. ........................ 307/10.1

OTHER PUBLICATIONS

Japanese Laid–Open Publication No. 50–112935 (filed Feb. 18, 1974) for "Air Bag Activating Device" (partial English branslation provided).

* cited by examiner

Primary Examiner—William A. Cuchlinski, Jr.
Assistant Examiner—Edward Pipala
(74) Attorney, Agent, or Firm—Armstrong, Westerman, Hattori, McLeland & Naughton

(57) ABSTRACT

If a seat belt is not fastened, then a first switch is turned on and a second switch is turned off, and a fastened status detector outputs an impact decision level signal to a switch, which selects a signal from a first impact decision level output unit. Thus, when the speed of a motor vehicle is about 16 km/h or higher immediately prior to a collision, an air bag is inflated upon the collision. If the seat belt is fastened, then the first switch is turned off and the second switch is turned on, and the fastened status detector outputs an impact decision level signal, selecting a signal from a second impact decision level output unit. Thus, when the speed of the motor vehicle is about 24 km/h or higher immediately prior to a collision, the air bag is inflated upon the collision. If both the first and second switches are turned on or off due to a failure, the fastened status detector outputs the impact decision level signal, inflating the air bag when the vehicle speed of the motor vehicle immediately prior to a collision becomes greater than about 16 km/h, as is the case with the seat belt being not fastened. Even when the fastened state of the seat belt cannot be detected, therefore, vehicle occupants are protected safely by a vehicle occupant protection system.

7 Claims, 2 Drawing Sheets

VEHICLE OCCUPANT PROTECTION SYSTEM

BACKGROUND OF THE INVENTION

1. Field of the Invention

The present invention relates to a vehicle occupant protection system for inflating an air bag with a gas introduced from an inflator in a motor vehicle having a seat belt.

2. Description of the Related Art

In recent years, motor vehicles are equipped with a vehicle occupant protection system usually referred to as an air bag for protecting vehicle occupants against damage from collisions. When the motor vehicle collides with an object, the vehicle occupant protection system introduces a gas from an inflator into bags for thereby inflating the bags in response to a start signal representing a large acceleration caused by the collision. The vehicle occupant protection system is set to operate upon a collision at a relatively low speed of about 16 km/h (10 mph) so that it can protect vehicle occupants even when seat belts are not fastened.

When the seat belts are fastened, they can satisfactorily protect the vehicle occupants only with the restraint forces from the seat belts upon collisions at certain speeds higher than about 16 km/h. However, since the vehicle occupant protection system is also activated upon collisions at lower speeds, any subsequent repair of the motor vehicle entails a relatively large expenditure of money because the vehicle occupant protection system also needs to be repaired for reuse.

Japanese laid-open patent publication No. 50-112935 discloses an air bag activating device capable of detecting whether seat belts are fastened or not, and switching between air bag operation levels depending on the detected status.

The disclosed air bag activating device is disadvantageous in that if it erroneously detects that seat belts are fastened even though vehicle occupants do not fasten the seat belts, then the air bag activating device may possibly fail to activate the air bags properly.

SUMMARY OF THE INVENTION

It is a general object of the present invention to provide a vehicle occupant protection system which can detect a fastened status of a seat belt to switch between air bag operation levels upon a collision, and which can be operated safely even when a fastened status of a seat belt cannot be detected.

A major object of the present invention is to provide a vehicle occupant protection system which is capable of detecting whether a seat belt is fastened or not based on a signal from a first switch that is turned off when the seat belt is fastened and a signal from a second switch that is turned on when the seat belt is fastened, switching between an impact decision level at the time the seat belt is not fastened and an impact decision level at the time the seat belt is fastened, based on the signals from the first and second switches, and comparing the magnitude of an impact caused by a collision with the impact decision level to decide whether a gas is to be introduced into an air bag.

Another object of the present invention is to provide a vehicle occupant protection system which has a first switch that is turned off when a seat belt is fastened and a second switch that is turned on when the seat belt is fastened, the first and second switches being mounted in a buckle for receiving the tongue of the seat belt, so that the first and second switches can automatically be turned on or off in response to the tongue being inserted into or removed from the buckle.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
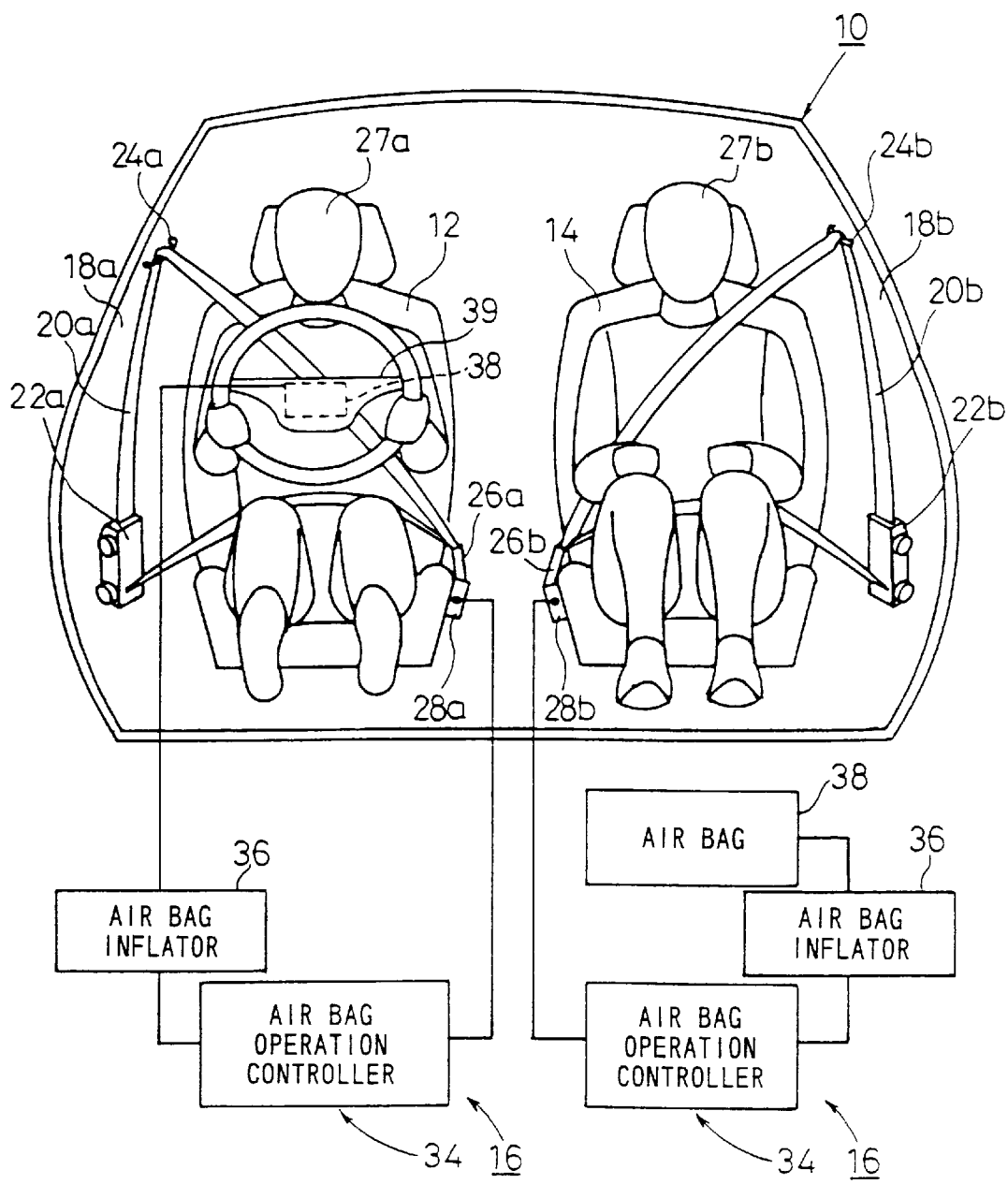
FIG. 1 is a schematic view of a motor vehicle incorporating a vehicle occupant protection system according to the present invention.

As shown in FIG. 1, a motor vehicle 10 has a driver's seat 12 and a passenger's seat 14 which are disposed side by side in a vehicle body. The driver's seat 12 and the passenger's seat 14 are associated with respective vehicle occupant protection systems 16 according to the present invention.

The motor vehicle 10 includes a pair of laterally spaced central pillars 18a, 18b supporting respective retractors 22a, 22b on their lower portions from which respective seat belts 20a, 20b extend. The seat belts 20a, 20b extend through respective holders 24a, 24b mounted on upper portions of the central pillars 18a, 18b, respectively. When respective tongues 26a, 26b of the seat belts 20a, 20b are inserted and locked in respective buckles 28a, 28b mounted on respective sides of the driver's seat 12 and the passenger's seat 14, the seat belts 20a, 20b extend across and over a driver 27a seated on the driver's seat 12 and a passenger 27b seated on the passenger's seat 14 for thereby restraining chests and hips of the driver 27a and the passenger 27b.

Figure 2:
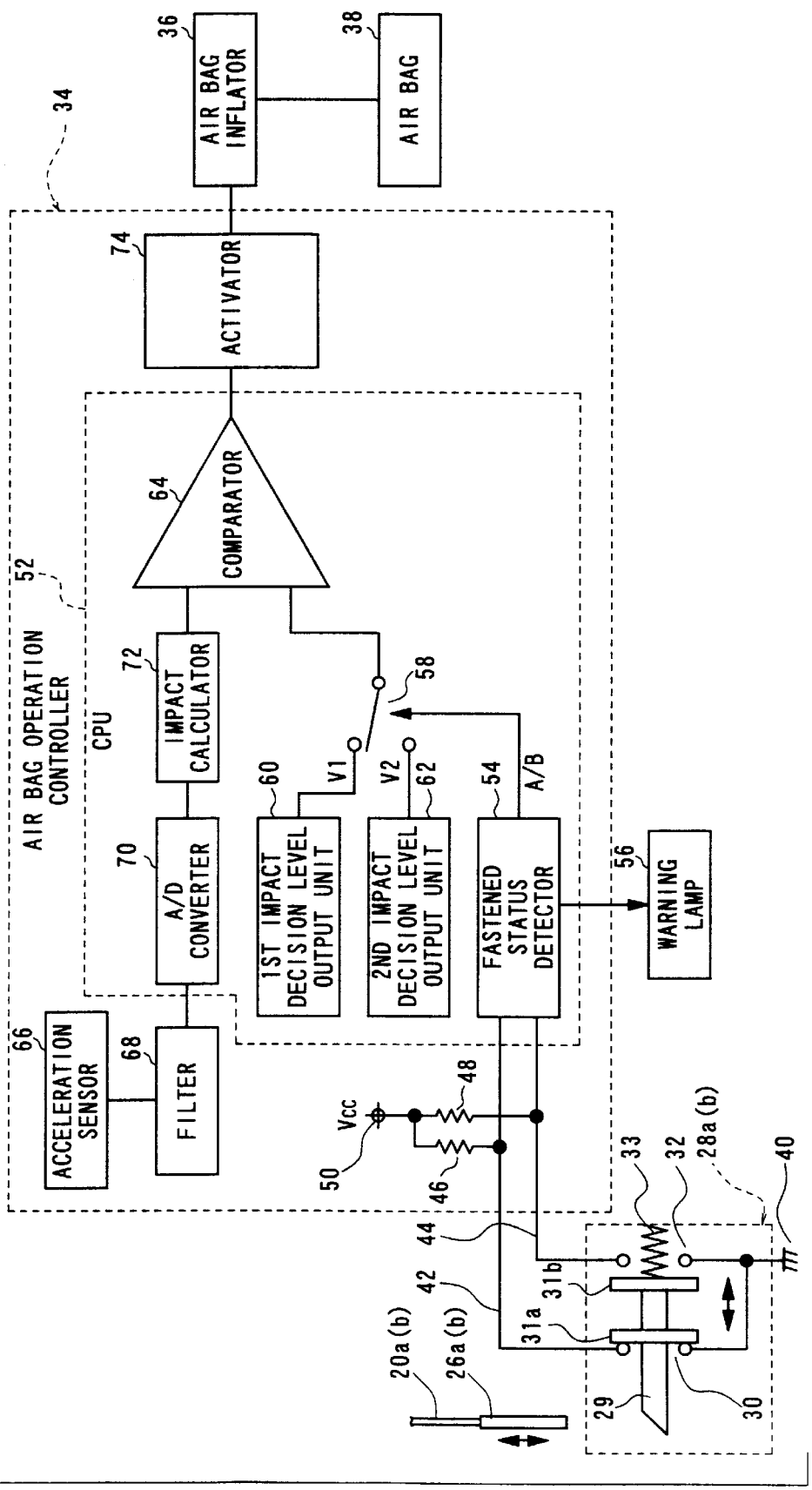
FIG. 2 is a block diagram of the vehicle occupant protection system shown in FIG. 1.

As shown in FIG. 2, each of the buckles 28a, 28b has first and second switches 30, 32 for detecting whether the tongues 26a, 26b are inserted in the respective buckles 28a, 28b. The first and second switches 30, 32 are electrically connected to an air bag operation controller 34 that is associated with each of the driver's seat 12 and the passenger's seat 14. As shown in FIG. 1, the air bag operation controllers 34 associated with the driver's seat 12 and the passenger's seat 14, respectively, have output terminals connected to respective air bag inflators 36 for introducing a gas into air bags 38 which are associated respectively with the driver's seat 12 and the passenger's seat 14. Specifically, the air bag 38 associated with the driver's seat 12 is typically mounted in the hub of a steering wheel 39 positioned in front of the driver's seat 12, and the air bag 38 associated with the passenger's seat 14 is typically mounted in a dashboard (not shown) positioned in front of the passenger's seat 14.

As shown in FIG. 2, each of the buckles 28a, 28b has a displaceable bar 29 which can be displaced along its own axis by one of the tongues 26a, 26b when it is inserted into the corresponding buckle. Two spaced contact plates 31a, 31b made of an electrically conductive material are fixedly mounted on the displaceable bar 29. The displaceable bar 29 is normally urged to move axially by a spring 33. When the tongue 26a or 26b is not inserted, the displaceable bar 29 is axially displaced under the bias of the spring 33 to cause the contact plate 31a to connect contacts of the first switch 30 for thereby turning on the first switch 30, and also to cause the contact plate 31b to disconnect contacts of the second switch 32 for thereby turning off the second switch 32. When the tongue 26a or 26b is inserted, the displaceable bar 29 is axially displaced against the bias of the spring 33 to cause the contact plate 31a to disconnect the contacts of the first switch 30 for thereby turning off the first switch 30, and also to cause the contact plate 31b to connect the contacts of the second switch 32 for thereby turning on the second switch 32.

The first and second switches 30, 32 have terminals connected to a ground terminal (common electrode) 40, so that these terminals of the first and second switches 30, 32 are maintained at a ground potential (potential L). The first and second switches 30, 32 have other terminals connected through respective signal lines to respective terminals of pull-up resistors 46, 48 whose other terminals are connected to a power supply 50 which supplies a potential H. Therefore, when the first and second switches 30, 32 are turned off, the potential H from the power supply 50 is applied to the signal lines 42, 44, and when the first and second switches 30, 32 are turned on, the potential L from the ground terminal 40 are applied to the signal lines 42, 44. The signal lines 42, 44 are connected to a fastened status detector 54 in a CPU 52 that serves as part of the air bag operation controller 34. The fastened status detector 54 comprises a logic circuit which outputs an impact decision level signal B only when the signal line 42 supplies the potential H and the signal line 44 supplies the potential L, and outputs an impact decision level signal A when the signal lines 42, 44 supply other potential combinations, as shown in Table below.

TABLE

| Signal line 42 | Signal line 44 | Seat belt status | Impact decision level signal | Warning/ normal |
|---|---|---|---|---|
| L | L | Failure (seat belt not fastened) | A | Warning |
| L | H | Seat belt not fastened | A | Normal |
| H | L | Seat belt fastened | B | Normal |
| H | H | Failure (seat belt not fastened) | A | Warning |

A warning lamp (warning unit) 56 is connected to the fastened status detector 54. When the signal lines 42, 44 supply the potentials L, L, respectively, the fastened status detector 54 outputs a warning signal to the warning lamp 56, which is energized in response to the warning signal. The impact decision level signals A, B are supplied as a switching signal to a switch (selector) 58 connected to a first impact decision level output unit 60 and a second impact decision level output unit 62. The first impact decision level output unit 60 outputs a signal V1 corresponding to a vehicle speed of about 16 km/h (10 mph ), for example, and the second impact decision level output unit 62 outputs a signal V2 corresponding to a vehicle speed of about 24 km/h (15 mph ) (V2>V1). The switch 58 selects the signal V1 from the first impact decision level output unit 60 when the fastened status detector 54 outputs the impact decision level signal A to the switch 58, and selects the signal V2 from the second impact decision level output unit 62 when the fastened status detector 54 outputs the impact decision level signal B to the switch 58. The switch 58 applies a selected signal to an input terminal of a comparator 64.

The air bag operation controller 34 includes an acceleration sensor 66 for detecting the magnitude of an impact produced when the motor vehicle 10 collides with an object. An analog output signal from the acceleration sensor 66 is supplied through a filter 68 to an A/D converter 70 in the CPU 52. The A/D converter 70 converts the supplied analog signal into a digital signal, which is supplied to an impact calculator 72. The impact calculator 72 calculates the supplied signal and applies the calculated signal to the other input terminal of the comparator 64. The comparator 64 compares the processed signal with the signal V1 from the first impact decision level output unit 60 or the signal V2 from the second impact decision level output unit 62, and applies a compared result signal to an activator 74. In response to the compared result signal from the comparator 64, the activator 74 outputs an ignition signal to the air bag inflator 36, which then introduces a gas into the air bag 38 based on the ignition signal.

Operation and advantages of the vehicle occupant protection system 16 thus constructed will be described below.

When the seat belts 20a, 20b are not fastened, the first switch 30 is turned on and the second switch 32 is turned off. The signal line 42 applies the potential L and the signal line 44 applies the potential H. As indicated by in Table shown above, the fastened status detector 54 outputs the impact decision level signal A to the switch 58. In response to the impact decision level signal A, the switch 58 selects the signal V1 from the first impact decision level output unit 60, and applies the selected signal V1 (corresponding to the vehicle speed of about 16 km/h) to the comparator 64.

The acceleration sensor 66 detects the acceleration of the motor vehicle 10, and supplies a detected acceleration signal through the filter 68 to the A/D converter 70. The A/D converter 70 converts the acceleration signal into a digital signal and supplies the digital signal to the impact calculator 72. Therefore, the impact calculator 72 always recognizes the acceleration of the motor vehicle 10.

When the motor vehicle 10 collides with an object, the motor vehicle 10 is subjected to a large acceleration. The detected acceleration is transmitted from the acceleration sensor 66 through the filter 68 and the A/D converter 70 to the impact calculator 72. The impact calculator 72 applies an acceleration signal commensurate with the magnitude of the acceleration to the comparator 64. The comparator 64 compares the acceleration signal with the signal V1 from the first impact decision level output unit 60, and applies a compared result signal to the activator 74.

For example, if the vehicle speed of the motor vehicle 10 immediately prior to any collision is equal or less than about 16 km/h, then an acceleration signal produced from the impact calculator 72 by a collision is always lower in level than the signal V1 from the first impact decision level output unit 60. Since the comparator 64 outputs a low-level potential L, the activator 74 outputs no ignition signal to the air bag inflator 36. The air bag inflator 36 is not activated.

If the vehicle speed of the motor vehicle 10 immediately prior to any collision is greater than about 16 km/h, then an acceleration signal produced from the impact calculator 72 by a collision may become higher in level than the signal V1 from the first impact decision level output unit 60. At this time, the comparator 64 outputs a high-level potential H, and the activator 74 outputs an ignition signal to the air bag inflator 36. Therefore, the air bag inflator 36 is actuated to introduce a gas into the air bag 38 for thereby inflating the air bag 38. The inflated air bag 38 absorbs the impact imposed on the occupant by the collision. In this manner, the occupants on the driver's seat 12 and the passenger's seat 14 are protected from damage by the air bags 38.

When the seat belts 20a, 20b are fastened, the first switch 30 is turned off and the second switch 32 is turned on. The signal line 42 applies the potential H and the signal line 44 applies the potential L. As indicated by in Table shown above, the fastened status detector 54 outputs the impact decision level signal B to the switch 58. In response to the impact decision level signal B, the switch 58 selects the signal V2 from the second impact decision level output unit 62, and applies the selected signal V2 (corresponding to the vehicle speed of about 24 km/h) to the comparator 64.

If the vehicle speed of the motor vehicle 10 immediately prior to any collision is equal or less than about 24 km/h, then an acceleration signal produced from the impact calculator 72 by a collision is always lower in level than the signal V2 (V2>V1) from the second impact decision level output unit 62. Since the comparator 64 outputs a low-level potential L, the activator 74 outputs no ignition signal to the air bag inflator 36. Because the vehicle speed of the motor vehicle 10 immediately prior to any collision was equal or less than about 24 km/h, the occupants are sufficiently protected from damage by the seat belts 20a, 20b only.

If the vehicle speed of the motor vehicle 10 immediately prior to any collision is greater than about 24 km/h, then an acceleration signal produced from the impact calculator 72 by a collision may become higher in level than the signal V2 from the second impact decision level output unit 62. At this time, the comparator 64 outputs a high-level potential H, and the activator 74 outputs an ignition signal to the air bag inflator 36. Therefore, the air bag inflator 36 is activated to introduce a gas into the air bag 38 for thereby inflating the air bag 38. The inflated air bag 38 absorbs the impact imposed on the occupant by the collision. In this manner, the occupants on the driver's seat 12 and the passenger's seat 14 are protected from damage by the seat belts 20a, 20b and the air bags 38.

When the first switch 30 fails, the vehicle occupant protection system 16 operates as follows:

If the first switch 30 remains turned on regardless of the seat belts 20a, 20b being fastened, when the second switch 32 is turned on, both the signal lines 42, 44 supply the potential L. At this time, the fastened status detector 54 determines that a failure has occurred in the buckles 28a, 28b, and issues a warning signal to the warning lamp 56 thereby to energize the warning lamp 56. At the same time, the fastened status detector 54 outputs the impact decision level signal A to the switch 58.

If the first switch 30 remains turned off regardless of the seat belts 20a, 20b being not fastened, when the second switch 32 is turned off, both the signal lines 42, 44 supply the potential H. At this time, the fastened status detector 54 also determines that a failure has occurred in the buckles 28a, 28b, and issues a warning signal to the warning lamp 56 thereby to energize the warning lamp 56. At the same time, the fastened status detector 54 outputs the impact decision level signal A to the switch 58.

In case of these failures, the switch 58 selects the signal V1 from the first impact decision level output unit 60 and applies the selected signal V1 to the comparator 64. Consequently, irrespective of whether the seat belts 20a, 20b are fastened or not, the air bag operation controller 34 is armed to inflate the air bags 38 when the vehicle speed of the motor vehicle 10 immediately prior to any collision becomes greater than about 16 km/h.

When the second switch 32 fails, the vehicle occupant protection system 16 operates as follows:

If the second switch 32 remains turned on regardless of the seat belts 20a, 20b being not fastened, when the first switch 30 is turned on, the signal line 42 supplies the potential L, and the fastened status detector 54 outputs the impact decision level signal A to the switch 58. If the second switch 32 remains turned off regardless of the seat belts 20a, 20b being fastened, the signal line 44 supplies the potential H, and the fastened status detector 54 outputs the impact decision level signal A to the switch 58 irrespective of whether the first switch 30 is turned on or off. Therefore, the switch 58 selects the signal V1 from the first impact decision level output unit 60 and applies the selected signal V1 to the comparator 64. Consequently, the air bag operation controller 34 is armed to inflate the air bags 38 when the vehicle speed of the motor vehicle 10 immediately prior to any collision becomes greater than about 16 km/h.

If a harness encasing the signal lines 42, 44 is broken or disconnected, then both the signal lines 42, 44 supply the potential H at all times. If the power supply 50 fails to apply the voltage to the pull-up resistors 46, 48, then both the signal lines 42, 44 supply the potential L at all times. Upon these failures, the fastened status detector 54 outputs the impact decision level signal A to the switch 58, and also outputs the impact decision level signal A to the switch 58. Thus, the air bag operation controller 34 is armed to inflate the air bags 38 when the vehicle speed of the motor vehicle 10 immediately prior to any collision becomes greater than about 16 km/h. When both the first and second switches 30, 32 are turned on or off due to a failure, the air bag operation controller 34 is armed to inflate the air bags 38 when the vehicle speed of the motor vehicle 10 immediately prior to any collision becomes greater than about 16 km/h, as is the case with the seat belts 20a, 20b being not fastened.

As described above, if one or both of the first and second switches 30, 32 fail, making it impossible to confirm the status of the seat belts 20a, 20b, then the air bags 38 are inflated upon a collision when the vehicle speed of the motor vehicle 10 immediately prior to the collision has been greater than about 16 km/h, as is the case with the seat belts 20a, 20b being not fastened. Accordingly, the occupants on the driver's seat 12 and the passenger's seat 14 are protected more reliably when the motor vehicle 10 collides with an object.

As described above, the vehicle occupant protection system 16 according to the present invention inflates the air bags 38 at a greater acceleration of the motor vehicle 10 when the seat belts 20a, 20b are fastened, than when the seat belts 20a, 20b are not fastened. While the motor vehicle 10 is running at a speed at which it is possible to protect the occupants only with the restraint forces from the seat belts 20a, 20b upon a collision, the air bags 38 are not inflated even when the motor vehicle 20 collides with an object at such a speed. As a result, any subsequent repair of the motor vehicle 10 entails a relatively small expenditure of money because the vehicle occupant protection system 16 does not need to be repaired. When one or both of the first and second switches 30, 32 fail, making it impossible to confirm the status of the seat belts 20a, 20b, the air bags 38 are inflated upon a collision when the vehicle speed of the motor vehicle 10 immediately prior to the collision is the same as is the case with the seat belts 20a, 20b being not fastened. Accordingly, the occupants on the driver's seat 12 and the passenger's seat 14 are protected more reliably than possible with the conventional vehicle occupant protection system when the motor vehicle 10 collides with an object.

Although a certain preferred embodiment of the present invention has been shown and described in detail, it should be understood that various changes and modifications may be made therein without departing from the scope of the appended claims.

What is claimed is:

1. A vehicle occupant protection system for detecting an impact to introduce a gas from an inflator into an air bag to inflate the air bag in a motor vehicle, comprising:

a detector for detecting an impact;

an impact calculator for calculating a magnitude of the impact from an output signal from said detector;

a first switch for being turned on when a seat belt in the motor vehicle is not fastened and being turned off when the seat belt is fastened;

a second switch for being turned off when the seat belt is not fastened and being turned on when the seat belt is fastened;

a fastened status detector for detecting whether the seat belt is fastened or not, based on output signals from said first switch and said second switch;

a selector for selecting either an impact decision level when the seat belt is not fastened or an impact decision level when the seat belt is fastened, based on an output signal from said fastened status detector;

a comparator for comparing the magnitude of the impact calculated by said impact calculator with the impact decision level selected by said selector, and outputting an activating signal when the calculated magnitude of the impact is greater than the selected impact decision level; and an activator for activating the insulator to introduce a gas into the air bag in response to the activating signal from said comparator;

said selector having means for selecting the impact decision level when the seat belt is not fastened if both said first switch and said second switch are turned on or off.

2. A vehicle occupant protection system according to claim 1, wherein said seat belt has a tongue insertable into and removable from a buckle, said first switch and said second switch being mounted in said buckle.

3. A vehicle occupant protection system according to claim 1, wherein said first switch and said second switch have terminals connected to a common electrode for supplying a predetermined potential and other terminals connected to said fastened status detector.

4. A vehicle occupant protection system according to claim 3, wherein said common electrode comprises a ground terminal.

5. A vehicle occupant protection system according to claim 1, wherein said detector comprises an acceleration sensor.

6. A vehicle occupant protection system according to claim 1, wherein said selector comprises a switch, further comprising a first impact decision level output unit connected to said switch and a second impact decision level output unit connected to said switch, said switch comprising means for applying a signal from said first impact decision level output unit or a signal from said second impact decision level output unit as said selected impact decision level to said comparator.

7. A vehicle occupant protection system according to claim 1, further comprising a warning unit, said fastened status detector having means for outputting a warning signal to said warning unit if both said first switch and said second switch are turned on or off.

* * * * *